(12) United States Patent
Shigeta et al.

(10) Patent No.: US 12,724,585 B2
(45) Date of Patent: Sep. 1, 2026

(54) INFORMATION PROVIDING METHOD AND INFORMATION PROVIDING SYSTEM

(71) Applicant: Nissan Motor Co., Ltd., Kanagawa (JP)

(72) Inventors: Miyuki Shigeta, Kanagawa (JP); Takura Yanagi, Kanagawa (JP); Atsushi Takamatsu, Kanagawa (JP); Akihiko Ebina, Kanagawa (JP); Shota Okubo, Kanagawa (JP); Saori Ono, Kanagawa (JP)

(73) Assignee: Nissan Motor Co., Ltd., Kanagawa (JP)

( * ) Notice: Subject to any disclaimer, the term of this patent is extended or adjusted under 35 U.S.C. 154(b) by 128 days.

(21) Appl. No.: 18/863,910

(22) PCT Filed: May 10, 2023

(86) PCT No.: PCT/IB2023/000283
§ 371 (c)(1),
(2) Date: Nov. 7, 2024

(87) PCT Pub. No.: WO2023/218244
PCT Pub. Date: Nov. 16, 2023

(65) Prior Publication Data

US 2026/0186737 A1 Jul. 2, 2026

(30) Foreign Application Priority Data

May 11, 2022 (JP) ................................ 2022-078464

(51) Int. Cl.
*G06F 3/16* (2006.01)
*B60K 35/10* (2024.01)
(Continued)

(52) U.S. Cl.
CPC .............. *G06F 3/167* (2013.01); *B60K 35/10* (2024.01); *B60K 35/21* (2024.01); *B60K 35/26* (2024.01);
(Continued)

(58) Field of Classification Search
None
See application file for complete search history.

(56) References Cited

U.S. PATENT DOCUMENTS 6,567,867 B1 5/2003 Saito et al.

FOREIGN PATENT DOCUMENTS

JP 2000-353025 A 12/2000
JP 2001-183153 A 7/2001
(Continued)

*Primary Examiner* — Christopher J Kohlman
(74) *Attorney, Agent, or Firm* — Osha Bergman Watanabe & Burton LLP

(57) ABSTRACT

An information providing method provides information using an output equipment disposed in a vehicle to a user who is an occupant of the vehicle. The information providing method includes: determining a topic provided to the user and first information related to the corresponding topic, outputting the first information through the output equipment, detecting the user's reaction when the output equipment has output the first information, estimating an interest level of the user on the topic based on the user's reaction, and outputting a second information which is more detailed information on the topic than the first information through the output equipment when the interest level is higher than a predetermined first threshold.

19 Claims, 4 Drawing Sheets

(51) Int. Cl.

| | |
|---|---|
| ***B60K 35/21*** | (2024.01) |
| ***B60K 35/26*** | (2024.01) |
| ***G01C 21/36*** | (2006.01) |
| ***G06T 7/70*** | (2017.01) |
| ***G06V 20/59*** | (2022.01) |
| *G10L 25/51* | (2013.01) |

(52) U.S. Cl.

CPC ............ *G01C 21/3679* (2013.01); *G06T 7/70* (2017.01); *G06V 20/597* (2022.01); *B60K 2360/18* (2024.01); *B60K 2360/741* (2024.01); *G06T 2207/30201* (2013.01); *G06T 2207/30268* (2013.01); *G10L 25/51* (2013.01)

(56) References Cited

FOREIGN PATENT DOCUMENTS

| | | | | |
|---|---|---|---|---|
| JP | 2009-037050 A | | 2/2009 | |
| JP | 2009-248193 A | | 10/2009 | |
| JP | 2010-198088 A | | 9/2010 | |
| JP | 2015-75971 | * | 4/2015 | ............ G06F 17/30 |
| JP | 2015-075971 A | | 4/2015 | |
| JP | 2018-134902 A | | 8/2018 | |
| JP | 2019-159559 A | | 9/2019 | |
| JP | 2020-144618 A | | 9/2020 | |

* cited by examiner

INFORMATION PROVIDING METHOD AND INFORMATION PROVIDING SYSTEM

TECHNICAL FIELD

The present disclosure relates to an information providing method and an information providing system.

BACKGROUND ART

JP2018-134902A discloses an information presentation system that displays driving-related information according to changes in a shape of a plurality of display bodies and allows a driver of a vehicle (user) to recognize the driving-related information.

SUMMARY OF INVENTION

However, in a typical conversation between people, a speaker of a certain topic estimates an interest (interest level) of the other person, and when the interest is estimated to be high, the speaker may add more detailed information on the corresponding topic.

In the information presentation system disclosed in JP2018-134902A, interest level of the user is not estimated, so that there is a risk that the information desired by a user may not be provided for a topic of high interest level to the user. Further, there is a risk that the user may feel inconvenience due to providing unnecessarily detailed information on an object of low interest level to the user.

The present disclosure has been made in view of the above problems and is directed to providing an information providing method and an information providing system capable of providing information desired by a user.

According to an embodiment of the present invention, an information providing method is provided for providing information using an output equipment installed in a vehicle to a user who is an occupant of the vehicle. This information providing method includes determining a topic and first information on the topic provided to the user, outputting the first information through the output equipment, detecting a reaction of the user when the output equipment outputs the first information, and estimating an interest level of the user on the topic based on the reaction of the user. When the interest level is higher than a predetermined first threshold, second information which is more detailed information on the topic than the first information is output through the output equipment.

DESCRIPTION OF EMBODIMENTS

Hereinafter, embodiments of the present disclosure will be described with reference to the drawings.

First Embodiment

Figure 1:
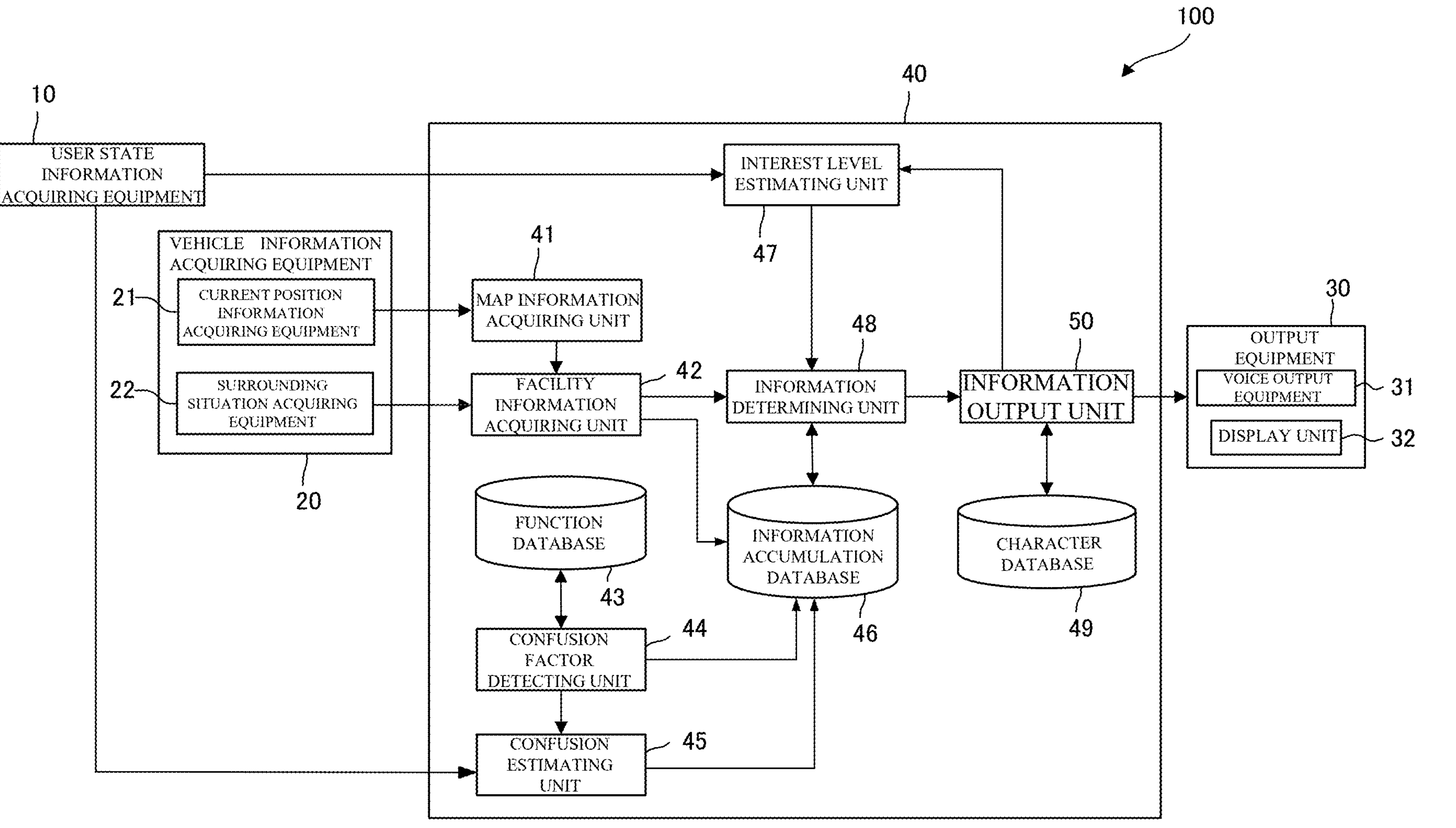
FIG. 1 is a block diagram showing a schematic configuration of an information providing system adopting an information providing method according to a first embodiment of the present disclosure.

FIG. 1 is a block diagram showing a schematic configuration of an information providing system 100 adopting an information providing method according to the first embodiment of the present disclosure. The information providing system 100 is mainly mounted on a vehicle, or the like. Here, in the present embodiment, a vehicle on which the information providing system 100 is mounted is simply referred to as the vehicle. Further, a user of the information providing system 100 refers to an occupant of the vehicle, that is, a driver and/or a passenger, but for simplification in the present embodiment, the driver of the vehicle is referred to as the user.

The information providing system 100 includes a user state information acquiring equipment 10, a vehicle information acquiring equipment 20, an output equipment 30, and a controller 40.

The user state information acquiring equipment 10 is a group of devices that detect a state of the user (driver) and includes an in-vehicle camera, an in-vehicle microphone, a passenger sensor, an eye tracker, a body temperature sensor, a heart rate sensor, a perspiration sensor, a brain wave sensor, etc. The in-vehicle camera is one or more imaging devices for photographing the interior of the vehicle to obtain a still image or a video thereof, and an image (including a video) for detecting an action of the user is acquired by continuously or intermittently photographing a range including the driver (user) in particular. Hereafter, the image acquired by the in-vehicle camera is referred to as an in-vehicle image. The in-vehicle microphone is one or more voice pickup devices that capture a sound or a voice generated inside the vehicle. The in-vehicle microphone acquires at least a voice uttered by the user. The passenger sensor detects presence or absence of a passenger in the vehicle. The eye tracker detects a line-of-sight direction of the user. The body temperature sensor, the heart rate sensor, the perspiration sensor, and the brain wave sensor detect the user's body temperature, heart rate, perspiration amount, and brain waves, respectively. Information such as the image, the voice, the passenger, the line-of-sight direction of the user, the user's body temperature, the heart rate, the perspiration amount, and the brain waves acquired by the user state information acquiring equipment 10 is transmitted to a controller 40 which will be described later as user state information.

In addition, the device (sensor) included in the user state information acquiring equipment 10 is not limited to those described above. For example, the user's action may be detected by an infrared sensor, and the line-of-sight direction of the user may be detected by the in-vehicle camera. Further, the user state information acquiring equipment 10 may include at least a device that allows the controller 40 which will be described later to detect the action, the voice, and the line-of-sight direction of the user, and other devices may be added arbitrarily.

The vehicle information acquiring equipment 20 is a group of devices that acquire information regarding current position and surrounding situation of the vehicle and includes a current position information acquiring equipment 21 and a surrounding situation acquiring equipment 22.

The current position information acquiring equipment 21 is a device for acquiring position information regarding the current position of the vehicle, and includes a global positioning system (GPS) receiving device, an orientation sensor, a distance sensor, a steering angle sensor, etc. The GPS receiving device detects the vehicle's position using an artificial satellite, and the orientation sensor, the distance sensor, and the steering angle sensor detect the vehicle's orientation (direction), distance between the vehicle and objects around the vehicle, and the vehicle's steering angle (direction of travel), respectively. The current position information acquiring equipment 21 acquires the position information of the vehicle by combining information detected from the GPS receiving device, the orientation sensor, the distance sensor, and the steering angle sensor. Here, the device (sensor) included in the current position information acquiring equipment 21 is not limited to those described above, and any device may be used as long as it may acquire the position information regarding the current position of the vehicle. For example, the position information may be acquired by a Global Navigation Satellite System (GNN) sensor, and the position information may be acquired only from the GPS receiving device. The position information acquired by the current position information acquiring equipment 21 is transmitted to the controller 40 which will be described later.

The surrounding situation acquiring equipment 22 includes a vehicle's external camera. The vehicle's external camera is one or more photographing devices for photographing the exterior of the vehicle to obtain a still image or a video thereof, and an image (including a video) for detecting the surrounding situation of the vehicle is acquired by continuously or intermittently photographing the surroundings of the vehicle. The external image of the vehicle acquired by the surrounding situation acquiring equipment 22 is transmitted to the controller 40 which will be described later as surrounding information. Further, the surrounding situation acquiring equipment 22 may include a front inter-vehicle distance sensor or a rear inter-vehicle distance sensor that acquires inter-vehicle distance information between a front vehicle and a rear vehicle.

The output equipment 30 includes a voice output equipment 31 which outputs a voice, and a display unit 32 which outputs an image.

The voice output equipment 31 is a device that outputs voice data for the user and includes, for example, a speaker capable of outputting a voice. The voice output equipment 31 outputs the voice data to be provided to the user received from the controller 40 which will be described later, as a voice.

The display unit 32 is configured of a device that outputs image data for the user and is, for example, a display capable of outputting an image. The display unit 32 outputs the image data to be provided to the user received from the controller 40 which will be described later and displays an image (including a video).

The controller 40 is a unit that controls the information providing system 100, determines the information to be provided to the user, and outputs the corresponding information through the output equipment 30.

The controller 40 is configured of a computer including a central processing unit (CPU), a read-only memory (ROM), a random access memory (RAM), and an input/output interface (I/O interface), and performs processing to provide information to the user by executing a specific program.

The controller 40 is a configuration for determining information to be provided to the user and includes a map information acquiring unit 41, a facility information acquiring unit 42, a function database 43, a confusion factor detecting unit 44, a confusion estimating unit 45, an information accumulation database 46, an interest level estimating unit 47, and an information determining unit 48. Further, the controller 40 is a configuration for outputting information through the output equipment 30 and includes a character database 49 and an information output unit 50.

The map information acquiring unit 41 specifies a current position of the vehicle on a map. In the map information acquiring unit 41, position information of the current position of the vehicle is input from the current position information acquiring equipment 21. Further, the map information acquiring unit 41 specifies the current position of the vehicle on the map by acquiring map information from a map database (not shown) inside or outside the controller 40 and comparing the map information with the position information. The map information acquiring unit 41 transmits the current position information of the vehicle on the map (current position information on the map) to the facility information acquiring unit 42. Further, the map database is updated with the latest information every predetermined period.

The facility information acquiring unit 42 acquires facility information on a facility around the current position of the vehicle. Further, in this case, the facility refers to a characteristic facility, a historical building, etc. In the facility information acquiring unit 42, the current position information on the map is input from the map information acquiring unit 41, and the surrounding information is input from the surrounding situation acquiring equipment 22. Further, the facility information acquiring unit 42 acquires the map information from the map database (not shown) inside or outside the controller 40. In the map database, facility information on each point is registered, and the facility information is included in the map information. The facility information acquiring unit 42 acquires information on a facility visible to the user's eyes and information on other facilities around the vehicle (hereinafter both are referred to as facility information) from the current position information on the map, the surrounding information, and the map information. In addition, the facility information acquiring unit 42 registers the facility information in the information accumulation database 46, and when there is a facility visible to the user's eyes, transmits a signal indicating the same (signaling presence of the facility) to the information determining unit 48 which will be described later. The facility information acquired from the facility information acquiring unit 42 becomes a candidate for information to be provided to the user. Here, the above-described method of acquiring the facility information is an example, and the method of acquiring the facility information is not limited thereto.

The function database 43 is a database that stores data of a function of an equipment in the vehicle. In the function database 43, information of the function equipped in each equipment in the vehicle, and a frequency of usage of each equipment and the function equipped in each equipment are registered. The function database 43 is updated with the latest information every predetermined period.

The confusion factor detecting unit 44 detects a function that confuses the user as a confusion factor among the functions of equipment in the vehicle. Here, the function that confuses the user (confusion factor) refers to a function that is recommended for use by the user, but is not used because the user does not know the existence of the function or does not know how to use the function. Specifically, the confusing function of an equipment refers to the function and the like of the corresponding equipment when a new equipment is added to the vehicle, when a predetermined equipment in the vehicle is updated, or when a predetermined equipment in the vehicle is not used for a long period of time or for a long term (hereinafter simply referred to as a long time). Further, a case in which the predetermined equipment is not used for a long time includes a case in which some of the functions equipped in the corresponding equipment are not used for a long time even though the corresponding equipment itself is being used. The confusion factor detecting unit 44 checks the function database 43 for an addition of a new equipment, an update of an equipment, and presence of an equipment that has not been used for a long time for each predetermined time (period). When it is detected that an equipment has been added or updated or has not been used for a long time, the confusion factor detecting unit 44 transmits information on the added or the updated function of the corresponding equipment or the function of the corresponding equipment that has not been used for a long time to the confusion estimating unit 45 as confusion factor information and registers the information in the information accumulation database 46 at the same time.

The confusion estimating unit 45 estimates whether the user is confused about handling a predetermined equipment (or a function). In the confusion estimating unit 45, the user state information is input from the user state information acquiring equipment 10, and the confusion factor information is input from the confusion factor detecting unit 44. The confusion estimating unit 45 estimates whether the user is confused about handling of a predetermined equipment based on a detected user's behavior included in the user state information and the confusion factor information. Here, the action of the user refers to an action of the user, a voice emitted by the user, and a change in the direction of the user's line-of-sight. For example, when it is detected that the user is trying to use an equipment equipped with the function of the confusion factor from an action of the user captured by the in-vehicle camera, or when it is detected that a handling method of the corresponding equipment by the user is incorrect, the user may be estimated to be confused. If the user is estimated to be confused about handling of a predetermined equipment, the confusion estimating unit 45 registers the information of the corresponding equipment in the information accumulation database 46 as the confusing equipment information. Further, the method of estimating whether the user is confused is not limited to the above method. For example, confusion of the user may be estimated based solely on the user's behavior detected by the user state information acquiring equipment 10.

In the information accumulation database 46, information that is a candidate for information to be provided to the user is stored. For example, in the information accumulation database 46, information regarding handling of various equipment in the vehicle is stored. Further, in the information accumulation database 46, the facility information from the facility information acquiring unit 42, the confusion factor information from the confusion factor detecting unit 44, the confusing equipment information from the confusion estimating unit 45, etc. are stored. Here, the information accumulation database 46 is updated every predetermined time.

The interest level estimating unit 47 estimates an interest level of the user for the information (first information) that the information providing system 100 is providing to the user. In the interest level estimating unit 47, the user state information is input from the user state information acquiring equipment 10, and the interest level of the user is estimated based on the corresponding user state information when the information (first information) is provided to the user. The estimated interest level of the user is transmitted to the information determining unit 48. Further, details of the interest level estimating unit 47 will be described later.

The information determining unit 48 determines a topic and information to be provided to the user from the information accumulation database 46. Specifically, the information determining unit 48 checks the information accumulation database 46 for presence or absence of the confusing equipment information, and when the confusing equipment information is registered, the information determining unit 48 determines the equipment that the user is confused about handling as the topic, and at the same time, determines the information on the corresponding equipment as information to be provided to the user (first information). Further, when the information determining unit 48 receives a signal (a facility presence signal) indicating that there is a facility visible to the user's eyes from the facility information acquiring unit 42, the information determining unit 48 determines the corresponding facility as a topic and at the same time, determines information on the facility visible to the user's eyes as information to be provided to the user (first information) among the facility information stored in the information accumulation database 46. Further, when the information determining unit 48 checks the information accumulation database 46 for presence or absence of the confusion factor information and when the confusion factor is present, the information determining unit 48 determines an equipment equipped with the function of the confusion factor as the topic, and at the same time, determines information on the corresponding equipment as information to be provided to the user (first information). Here, the first information to be provided to the user is, for example, an outline of an object determined as a topic. When determining the topic and the first information, there is no particular limitation on which of the confusing equipment, the facility information, and the confusion factor are given priority, but in the present embodiment, the priority is set to be higher in the order of the confusing equipment, the facility information, and the confusion factor. Further, when neither the confusing equipment information nor the confusion factor information is registered in the information accumulation database 46, and the information determining unit 48 does not receive the facility presence signal, the topic and topic-related information (first information) to be provided to the user are randomly selected from the information stored in the information accumulation database 46.

Further, in the information determining unit 48, the interest level of the user is input from the interest level estimating unit 47. When the first information is provided to the user, when an interest level of the user for the first information is higher than a predetermined threshold (first threshold), the information determining unit 48 determines that more detailed information (second information, detailed information) than the first information on the object that is the topic as the information to be provided to the user. The information decided to be provided to the user is transmitted to the information output unit 50. Further, when the interest level of the user for the first information is lower than a second threshold that is set lower than a first threshold, the information determining unit 48 changes the topic and the first information.

The character database 49 stores a character-specific information (character-specific information) such as a character's appearance, utterance method, movement, and personality that the information output unit 50 described later displays on the display unit 32 of the output equipment 30. In the character database 49, a plurality of characters are registered and the character-specific information for each of characters is stored. Further, the character is not limited to a shape of a person, but may be expressed in a shape of an animal, a plant, an object, or other symbol, etc.

The information output unit 50 determines in what form the information to be provided to the user (the first information and second information) determined in the information determining unit 48 is output. In the present embodiment, the display unit 32 displays two characters, and the first information and the second information are output as a dialog between the characters. Further, the first information and the second information are information that may be output as voice in the present embodiment.

The information output unit 50 refers to the character-specific information which is stored in the character database 49 and determines by which character and in what scenario the information to be provided to the user is uttered. Specifically, the information output unit 50 determines which character to display on the display unit 32 from the character database 49 and obtains the character-specific information of the character from the character database 49. Further, the information output unit 50 divides the first information into a first part which is uttered by a character on one side (the first character), and a second part which is uttered by a character on the other side (the second character). Then, image (including a video) data of the determined character is output (displayed) to the display unit 32, and voice data of the first part and voice data of the second part are output from the voice output equipment 31 according to the action of the character displayed in the display unit 32. As a result, the first information is provided to the user. As such, by dividing the first information into two parts to utter to two characters, it is possible to provide to the user with the first information in a form of a dialog by the character. Thus, the user's responsibility to respond to the utterance from the information providing system 100 is relieved, which improves comfort level of the user.

When the first information is output through the output equipment 30, the information output unit 50 transmits a signal indicating that the first information has been output to the interest level estimating unit 47.

Further, the information output unit 50 determines which character to utter the second information (specific detail) to be provided to the user determined in the information determining unit 48. Then, an image (including a video) of the determined character is displayed on the display unit 32, and the voice data of the second information is output from the voice output equipment 31 according to the action of the character displayed on the display unit 32. As a result, the second information is provided to the user.

Further, the information output unit 50 outputs voice data from the voice output equipment 31 generated by an utterance method (e.g., diction, etc.) that fits the character's personality, etc. based on the character-specific information of the character to be used.

Further, the first information is output as a dialog of the first character and the second character, and the second information is output as an utterance of the first character or the second character. However, the output form of the first information and the second information is not limited thereto.

Further, the method for determining which character to display in the display unit 32 is not particularly limited, and for example, a character having an appearance or personality that fits the topic to be provided to the user may be selected.

Next, specific details of the interest level estimating unit 47 will be described.

When the first information to be provided to the user is output through the output equipment 30, a signal indicating that the first information is output to the interest level estimating unit 47 is input from the information output unit 50. When the signal indicating that the first information is output is input, the interest level estimating unit 47 estimates an interest level of the user for the first information (hereinafter simply referred to as an interest level of the user) based on a reaction of the user when the first information is output. Here, the reaction of the user is a state of the user detected by the user state information acquiring equipment 10 when the output equipment 30 outputs the first information, and the interest level estimating unit 47 estimates an interest level of the user based on the user state information from the user state information acquiring equipment 10.

More specifically, the reaction of the user includes the action of the user, and the interest level estimating unit 47 estimates an interest level of the user for the first information based on the action of the user included in the user state information. Here, the action of the user includes movement of the user detected from an image inside a vehicle, a voice uttered by the user acquired by the microphone inside a vehicle, and a movement in the line-of-sight direction of the user detected by the eye tracker, and the like. For example, when the output equipment 30 outputs the first information, in a case where the user state information acquiring equipment 10 detects that a user agreed, nodded one's head, made a voice such as "Oops", continued to look at a topic object for a predetermined period of time, or viewed at least one of the first character or the second character who uttered the first information, the interest level estimating unit 47 detects an interest level of the user to be high. Specifically, for example, the eye tracker acquires the image information of the user and at the same time, detects the line-of-sight direction of the face of the user included in the corresponding image information, and decides whether the detected line-of-sight direction matches (or approximately matches) a specific direction connecting the user's eyes and the output equipment 30 displaying the first and/or the second character. Then, when it is decided that the detected line-of-sight direction matches (or approximately matches) the specific direction, it is decided that the user looked at the first and/or the second character, and the interest level of the user is estimated to be high. On the other hand, when it is determined that the detected line-of-sight direction does not match (or approximately match) the specific direction, it is decided that the user is not looking at the first and/or the second character. Further, a known image recognition technology may be used for the detection of the face and the detection of the line-of-sight. As such, when the user performs an action showing interest in the first information, an interest level of the user is estimated to be higher than a predetermined threshold (first threshold), and more detailed information (second information) on the object that has become a topic is provided to the user.

The above is the main configuration of the information providing system 100. As described above, in the information providing system 100, the information provided to the user is determined from the information accumulation database 46, and the corresponding information is provided to the user through the output equipment 30.

However, when the information provided to the user is determined without estimating an interest level of the user, there is a risk that the information that the user wants may not be provided with respect to a topic of high interest to the user. Further, there is a risk of providing unnecessarily detailed information on an object of low interest to the user, thereby causing inconvenience to the user.

On the other hand, it is difficult to estimate an interest level of the user before providing the information, and there is a high risk of incorrect estimation of the interest level.

Accordingly, in the information providing system 100 which adopts the information providing method of the present embodiment, a topic provided to the user and the first information (e.g., an outline of an object of the topic) related to the corresponding topic are determined, and an interest level of the user for the first information is estimated based on the reaction of the user when the first information is output. When the interest level is higher than the first threshold, the second information which is more detailed information on the corresponding topic than the first information is output. As such, the second information which is the more detailed information, is output only when an interest level of the user is high, so the user may obtain detailed information only on a topic of interest to the user. That is, the information desired by the user can provided. Further, the inconvenience caused to the user by providing detailed information on a topic that the user is not interested in is prevented. Further, because the interest level of the user is estimated based on the reaction to the first information, accuracy of interest estimation is improved compared to a case where the interest level is estimated before information is provided.

Figure 2:
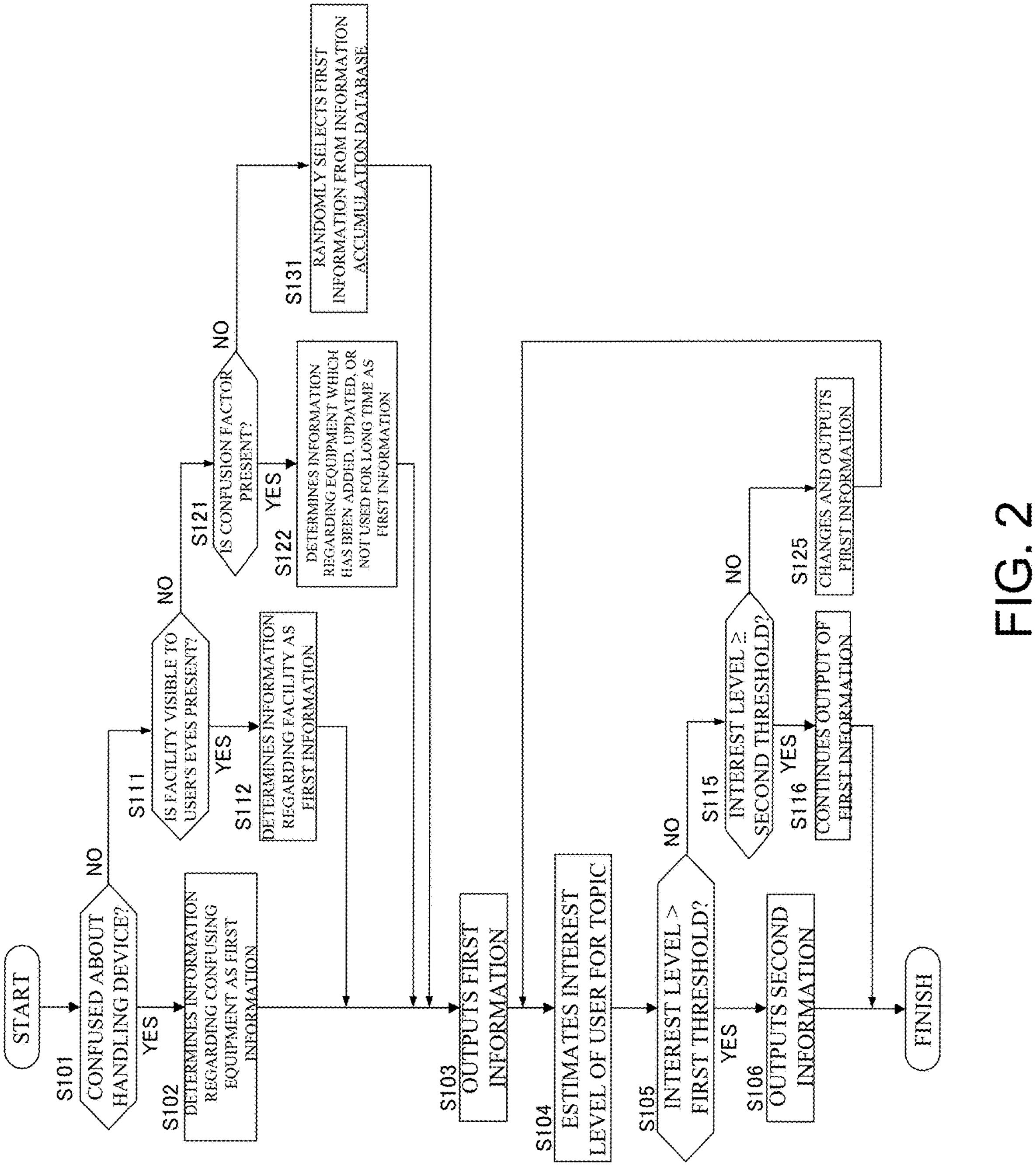
FIG. 2 is a flow chart describing the information providing method according to the first embodiment.

FIG. 2 is a flow chart describing the information providing method according to the first embodiment. Following controls are all repeatedly executed at a predetermined time by the controller 40. Further, the following controls may be started upon startup of the information providing system 100 and may also be started with some information already output for the user. Further, the controller 40 always acquires the user state information from the user state information acquiring equipment 10, and the position information and the surrounding information from the vehicle information acquiring equipment 20 at a predetermined time.

In step S101, the controller 40 estimates whether the user is confused about handling of a predetermined equipment or function. As described above, the estimation of whether the user is confused is estimated based on the detected user's behavior included in the user state information. When it is estimated from the user's behavior that the user is confused about handling of a predetermined equipment, the controller 40 executes processing of step S102. On the other hand, when the user is not estimated to be confused, the controller 40 executes processing of step S111.

In step S102, the controller 40 determines the corresponding equipment (the confusing equipment) that the user is confused about handling as a topic and determines an outline of the handling of the corresponding equipment (the confusing equipment) as the first information. As such, when the confusion of the user is estimated from the user's behavior detected before determining the first information, the outline of the handling of the confusing equipment is set as the first information.

In step S111, the controller 40 determines presence or absence of a facility visible to the user's eyes. The presence or absence of the facility is determined based on the current position information on the map, the surrounding information, and the map information. When the facility visible to the user's eyes is present, the controller 40 executes processing of step S112. On the other hand, when the facility visible to the user's eyes is not present, the controller 40 executes processing of step S121.

In step 112, the controller 40 determines the facility visible to the user's eyes as a topic. Further, the facility information of the corresponding facility is checked in the information accumulation database 46, and an outline of the corresponding facility is determined as the first information.

In step S121, the controller 40 determines presence or absence of a confusion factor. As described above, it is determined that a confusion factor exists when a new equipment is added to the vehicle, when a predetermined equipment in the vehicle is updated, or when it is detected that a predetermined equipment in the vehicle is not used for a long period of time. When the confusion factor is present, the controller 40 executes processing of step S122. On the other hand, when the confusion factor is not present, the controller 40 executes processing of step S131.

In step S122, the controller 40 determines the function of the added or the updated equipment, or the function of the equipment not used for a long time as a topic and determines an outline of the corresponding function as the first information.

In step S131, the controller 40 randomly selects from the information stored in the information accumulation database 46, determines an object of the selected information as a topic, and determines an outline of the corresponding object as the first information.

When the first information is determined in the step S102, S112, S122 or S131, the controller 40 outputs the first information through the output equipment 30 in step S103.

In step S104, the controller 40 estimates the interest level of the user for a topic. As described above, the interest level of the user is estimated based on a reaction of the user when the first information is output, especially an action of the user and for example, in cases such as when it is detected that the user has made an action to view at least one of the first character and the second character, the interest level is estimated to be high.

In step S105, the controller 40 determines whether the interest level of the user for the first information estimated in step S104 is higher than the predetermined first threshold. The first threshold may be set so that an interest level of the user exceeds the first threshold for example, when the output equipment 30 outputs the first information, and when the user is detected to have agreed, nodded one's head, made a voice such as "Oops", continued to look at a topic object for a predetermined period of time, or viewed at least one of the first character or the second character. When the interest level of the user for the first information is higher the first threshold, the controller 40 executes processing of step S106. On the other hand, when the interest level of the user for the first information is less than or equal to the first threshold, the controller 40 executes processing of step S115.

In step S106, the controller 40 outputs the second information through the output equipment 30, which is more detailed information than the first information regarding the topic.

As such, the controller 40 estimates the interest level of the user based on the action of the user when the first information is output (step S104), and outputs the second information when the interest level is higher than the first threshold (steps S105, S106). Therefore, the user can obtain detailed information on a topic by performing a simple action, for example, viewing the character. That is, since a special instruction is not required to obtain detailed information, inconvenience of operation is reduced, and the comfort level of the user is improved.

In step S105, when the interest level of the user for the first information is less than or equal to the first threshold, the controller 40 determines in step S115 whether the interest level of the user for the first information estimated in step S104 is greater than or equal to a predetermined second threshold. The second threshold, for example, when there is almost no change in the state of the user when the first information is output, or when the user outputs a negative keyword (for example, saying "Change to another topic"), the interest level of the user may be set to be lower than the second threshold. When the interest level of the user for the first information is greater than or equal to the second threshold, the controller 40 continues output of the first information in step S116. On the other hand, when the interest level of the user for the first information is lower than the second threshold, the controller 40 executes processing of step S125.

In step S125, the controller 40 changes the topic and the first information, and outputs the changed first information through the output equipment 30. The change in the topic and the first information may be randomly selected from the information stored in the information accumulation database 46 as in step S131. In step S125, when the changed first information is output, the controller 40 returns to the processing of step S104 to estimate the interest level of the user for the changed topic.

As such, when the interest level of the user for the first information is lower than the second threshold, the information (first information) provided to the user is changed (steps S115, S125). As a result, causing inconvenience to the user by continuing to provide information that the user is not interested in is prevented.

Further, in the present embodiment, determining the topic and the first information are set as separate steps respectively for convenience. However, in reality, the corresponding object automatically becomes the topic by providing the first information regarding the predetermined object to the user. Therefore, the controller 40 may be interpreted as determining the first information, thereby simultaneously determining the topic.

According to the information providing method of the above-described first embodiment, the following effects may be obtained.

The information providing method of the present embodiment estimates the interest level of the user for the first information based on the reaction of the user when the first information regarding the topic provided to the user is output, and when the interest level is higher than the first threshold, the second information is output which is more detailed information on the topic. As a result, the user can acquire detailed information only on a topic of interest to the user. That is, the information desired by the user can provided.

Further, because the interest level of the user is estimated based on the reaction to the first information, accuracy of interest estimation is improved compared to a case where the interest level is estimated before information is provided.

The information providing method of the present embodiment estimates the interest level of the user for the first information based on the action of the user when the first information is output, and when the interest level is higher than the first threshold, the second information is output which is more detailed information on the topic. As a result, the user can obtain detailed information on the topic by performing a simple action without giving a special instruction. Therefore, the comfort level of the user is improved.

The information providing method of the present embodiment divides the first information into a first part and a second part, outputs the first part as an utterance by the first character displayed in the display unit 32, and outputs the second part as an utterance by a second character displayed in the display unit 32. As such, the first information may be divided into two parts and uttered by two characters, providing the user with the first information in a form of a dialog by the character. Thus, the user's responsibility to respond to the utterance from the information providing system 100 is relieved, which improves the comfort level of the user.

The information providing method of the present embodiment estimates an interest level of the user for the first information to be high when it is detected that the user has performed an action to view at least one of the first character and the second character when the first information is output. Therefore, by performing a simple action of viewing the character, it is possible to increase the interest level to be higher than the first threshold and obtain detailed information (second information) on the topic. That is, since a special instruction is not required to obtain detailed information, inconvenience of operation is reduced, and the comfort level of the user is improved.

In the information providing method of the present embodiment, when it is detected that a new equipment has been added to the vehicle, a predetermined equipment in the vehicle has been updated, or a predetermined equipment in the vehicle has not been used for a long time, information on the corresponding equipment detected to be added, updated, or not used for a long time is determined as a first information provided to the user. As a result, the user may be prompted to use a function that is recommended for use by the user but is not used because the user does not know the existence of the function or does not know how to use the function.

The information providing method of this embodiment determines the information on handling of a respective predetermined equipment as the first information when it is estimated from the user's behavior that the user is confused about handling of the corresponding predetermined equipment. As a result, it is possible to provide information on handling of the equipment that the user wants when the user is confused.

In the present embodiment, the information providing method determines that when a facility visible to the user's eyes is present, the corresponding facility is determined as a topic, and the facility information regarding the corresponding facility is determined as the first information provided to the user. As such, by setting the topic as an object within the user's field of view, the user can guess where the information provided is coming from, thereby giving the user a sense of security.

The information providing method of the embodiment changes the first information when the interest level of the user for the first information is lower than a predetermined second threshold that is smaller than the first threshold. As a result, causing inconvenience to the user by continuing to provide information that the user is not interested in is prevented.

Here, in the present embodiment, information is provided by outputting a voice and an image for the user, but it is not limited thereto. For example, the information may be provided using only a voice.

Further, in the present embodiment, the information is provided to the user through the utterances of the two characters indicated in the display unit 32, but it is not necessarily limited thereto. For example, there may be one character to be displayed, and there may be three or more characters. Further, for example, the appearance of the output equipment 30 may be set as the appearance of the character. In this case, rather than displaying the character in the display unit 32, the output equipment 30 itself becomes the character. Therefore, for example, the first information may be provided through a dialog between the characterized output equipment 30 and the character displayed in the display unit 32. Here, the characterized output equipment 30 includes, for example, an agent equipment that is a small robot installed on a dashboard of a vehicle. Further, the agent equipment includes, for example, a robot modeled after an animal (e.g., a rabbit), a robot modeled after a virtual creature (e.g., face of an animation character), and a robot modeled after other objects (e.g., a TV-type equipment, a radio-type equipment), but is not limited thereto. Other equipment (e.g., smartphones, tablet terminals, car navigation equipment, IVI (In-Vehicle Infotainment)) having a user interface such as a display unit may be used as the agent equipment. In this case, it is possible to change the action form of the robot by displaying the above-described robot on the display unit and changing the display form of the robot.

Further, in the present embodiment, the first information is changed when the interest level of the user for the first information is lower than the second threshold, but the first information may be changed when a state where the interest level of the user is lower than the second threshold continues for a predetermined time. As a result, it is possible to prevent the first information from being changed when the user is interested in the first information that is currently being provided, because the first information is changed after it becomes more clear that the user is not interested in the first information.

Further, in the present embodiment, when a facility visible to the user's eyes is present, the corresponding facility is determined as a topic, and facility information of the corresponding facility is determined as the first information but is not limited thereto. When there is a facility around the vehicle, even when the facility is not visible to the user's eyes, the facility around the vehicle may be determined as a topic, and the facility information regarding the facility determined as the topic may be determined as the first information.

Further, in the present embodiment, when the confusing equipment, the facility visible to the user's eyes, and the confusion factor are all not present, and when the interest level of the user for the first information is lower than the second threshold, the first information provided to the user is randomly selected, but is not necessarily limited thereto. For example, rather than randomly selecting the first information, importance level may be set for each piece of information, and the information with high importance level may be selected as the first information preferentially.

Further, in the present embodiment, the second information is output as the utterance of the first character or the second character but is not necessarily limited thereto. For example, when the second information is information that may be output as an image, the second information may be displayed as an image in the display unit 32. As a result, apart from the voice output equipment 31, the second information may be provided to the user by the image displayed in the display unit 32. The image in this case includes not only a photo and a picture, but also a text, etc.

Further, in the present embodiment, when the confusion factor is present, the information on the equipment equipped with the function of the confusion factor is determined as the first information, and when the confusing equipment is present, the information on the corresponding equipment is determined as the first information, but is not necessarily limited thereto. For example, even when there is no confusion factor or confusing equipment present, information on handling of any equipment that may be used by the user in the vehicle may be determined as the first information provided to the user. As a result, the user's understanding of the functions of the equipment within the vehicle is improved, and various equipment within the vehicle may be used more effectively.

Second Embodiment

Figure 3:
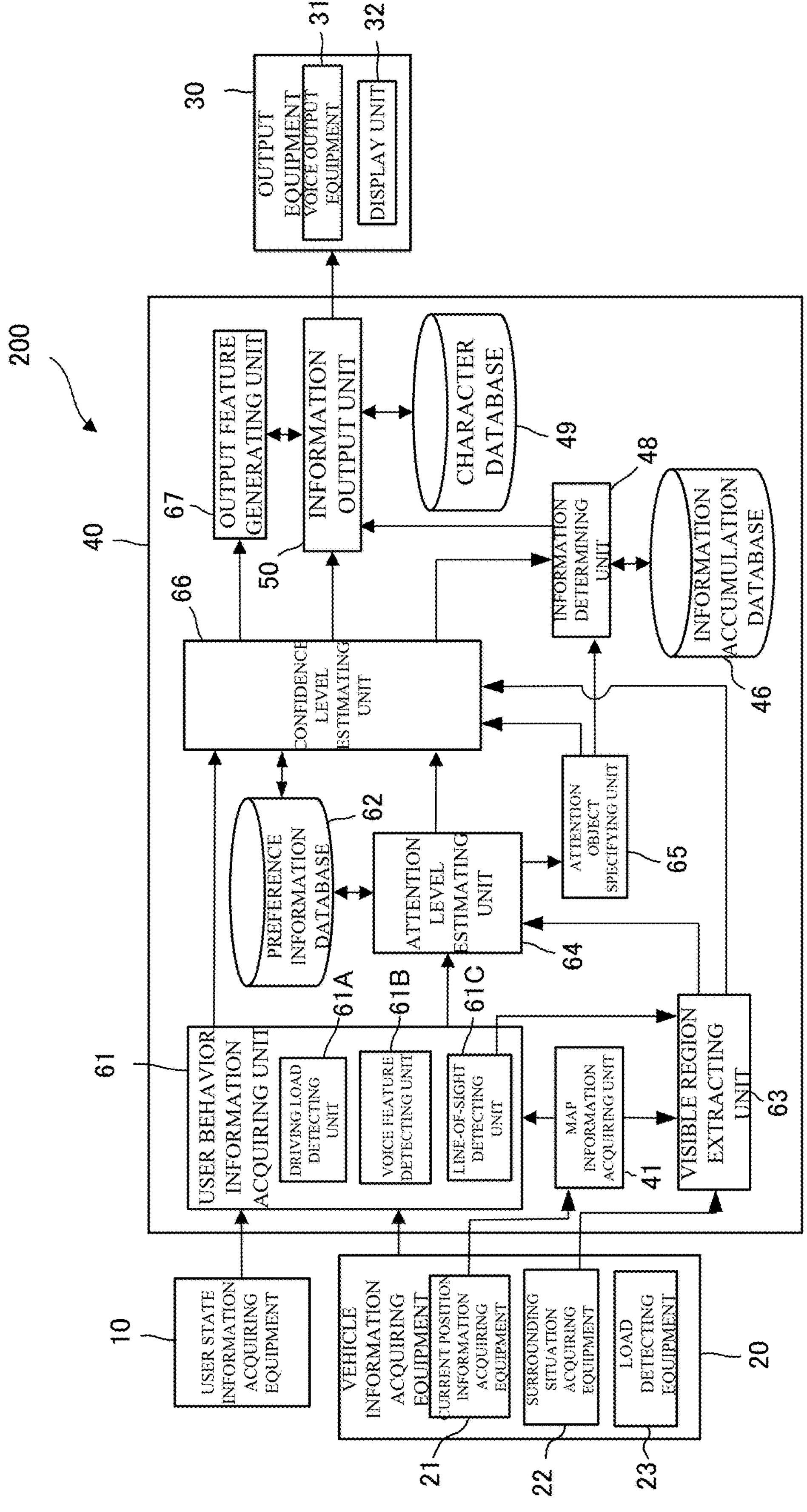
FIG. 3 is a block diagram showing a schematic configuration of an information providing system adopting an information providing method according to a second embodiment.
Figure 4:
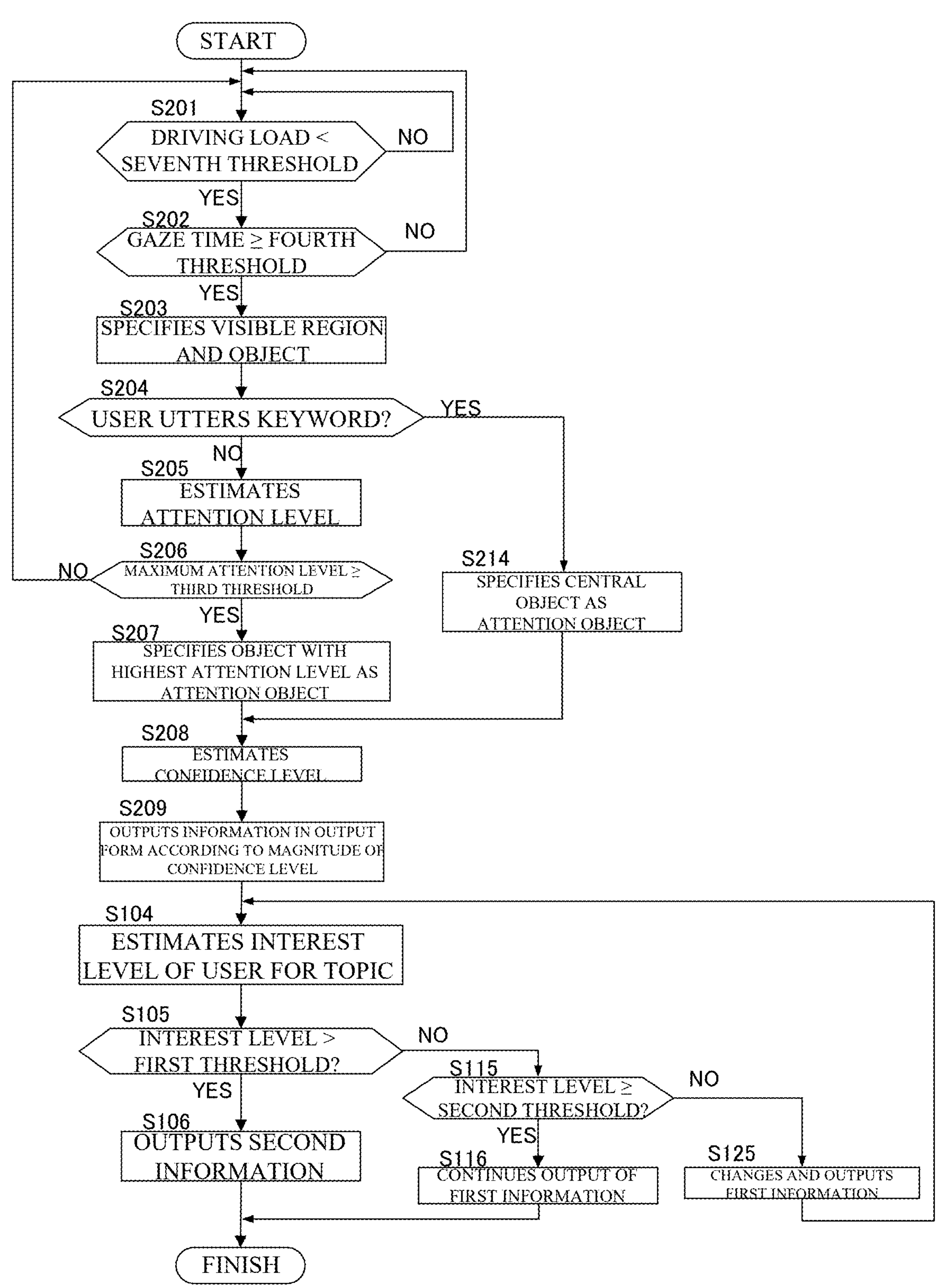
FIG. 4 is a flow chart describing the information providing method according to the second embodiment.

With reference to FIGS. 3 and 4, the information providing method of the second embodiment will be described. Here, same elements as those in the first embodiment are assigned the same reference numerals, and description is omitted.

FIG. 3 is a block diagram showing a schematic configuration of an information providing system 200 adopting an information providing method according to a second embodiment. In the second embodiment, a determination method of first information and an output form of the first information are different from those of the first embodiment.

As shown in FIG. 3, the information providing system 200 includes a user state information acquiring equipment 10, a vehicle information acquiring equipment 20, an output equipment 30, and a controller 40.

Description of the user state information acquiring equipment 10 and the output equipment 30 is omitted since they are the same as in the first embodiment.

The vehicle information acquiring equipment 20 includes a load detecting equipment 23 in addition to a current position information acquiring equipment 21 including a GPS receiving device that acquires position information of a vehicle, etc., and a surrounding situation acquiring equipment 22 including an exterior camera that acquires surrounding information, etc.

The load detecting equipment 23 includes a steering angle sensor of a handle or an accelerator opening degree sensor. Steering angle and accelerator opening degree detected by the load detecting equipment 23 are transmitted to the controller 40 and used to estimate a driving load described later.

The controller 40 includes a user behavior information acquiring unit 61, a preference information database 62, a visible region extracting unit 63, an attention level estimating unit 64, an attention object specifying unit 65, a confidence level estimating unit 66, and an output feature generating unit 67 in addition to the configuration described in the first embodiment. Here, with respect to FIG. 3, description of a facility information acquiring unit 42, a function database 43, a confusion factor detecting unit 44, a confusion estimating unit 45, and an interest level estimating unit 47 is omitted.

The user behavior information acquiring unit 61 includes a driving load detecting unit 61A, a voice feature detecting unit 61B, and a line-of-sight detecting unit 61C and acquires a behavior information of the user. In the user behavior information acquiring unit 61, user state information from the user state information acquiring equipment 10, position information, surrounding information, steering angle or accelerator opening degree information from the vehicle information acquiring equipment 20, and current position information from a map information acquiring unit 41 are input.

A driving load detecting unit 61A estimates driving load of a driver who is the user, from the user state information, the position information, the surrounding information, the steering angle or accelerator opening degree information, and the current position information. Estimation of the driving load is performed for example, according to a steering entropy method. Further, preferably, the driving load detecting unit 61A acquires the driver's skill data based on the current position information, the surrounding information, time-series data of the steering angle, time-series data of the accelerator opening degree, etc., and uses the skill data to estimate the driving load. As a result, estimation accuracy of the driving load may be increased.

A voice feature detecting unit 61B detects voice characteristics of the user's utterance, based on the voice uttered by the user acquired by an in-vehicle microphone. Here, the voice characteristics include content of a speech (for example, whether a specific keyword is included), volume of the voice, pitch of the voice, accent, etc. The voice feature detecting unit 61B acquires voice feature amount that quantifies the voice characteristics from the utterance of the user. Further, whether the voice is produced by the utterance of the user may be determined for example, by storing the voice characteristics of the user in advance.

A line-of-sight detecting unit 61C detects a time during which a line-of-sight of the user is directed in a direction of the line-of-sight of the user based on an image of the interior of the vehicle acquired by the in-vehicle camera (the user state information acquiring equipment 10) and a line-of-sight direction of the user detected by an eye tracker (user state information acquiring equipment 10). The line-of-sight detecting unit 61C acquires the line-of-sight direction and duration of the user in the line-of-sight as line-of-sight information. However, the method of acquiring the line-of-sight information is not limited to the above. For example, the line-of-sight information may be obtained from an image of the interior of a vehicle.

The driving load information estimated in the driving load detecting unit 61A, the voice feature amount acquired in the voice feature detecting unit 61B, and the line-of-sight information acquired in the line-of-sight detecting unit 61C are sent as user behavior information to the attention level estimating unit 64 and the confidence level estimating unit 66 which are described later. Further, the line-of-sight information acquired in the line-of-sight detecting unit 61C is also sent to the visible region extracting unit 63.

The preference information database 62 is a database that accumulates preference information of the user. The user's preference information is acquired based on the user's past behavior, etc. For example, a particular type of restaurant or facility which the user visits more frequently are registered as a corresponding dish or a facility of high preference level of the user. However, the method of acquiring the preference information is not limited to the above method.

The visible region extracting unit 63 specifies a visible region where the user can view, and a thing (object) included in the visible region. In the visible region extracting unit 63, the line-of-sight information acquired from the line-of-sight detecting unit 61C, the current position information on the map from the map information acquiring unit 41, and the surrounding information (an image of the exterior of the vehicle taken by the vehicle's external camera) from the surrounding situation acquiring equipment 22 are input. The visible region extracting unit 63 compares the line-of-sight direction of the user included in the line-of-sight information with the current position information on the map and the surrounding information to specify the visible region where the user can view, and based on the current position information on the map and the surrounding information, specifies the object included in the visible region. However, when the duration that the user is facing the direction of the user's line-of-sight is shorter than a predetermined time (a fourth threshold), it is not visible, and the visible region extracting unit 63 does not specify the object. Here, the predetermined time may be set, for example, to be such that the user is unable to acknowledge the object at an end of the line-of-sight direction. Further, the specification of the visible region is not limited to the above method but is at least based on the line-of-sight direction of the user. Information on the specified visible region and object is transmitted to the attention level estimating unit 64 and the confidence level estimating unit 66 which will be described later.

The attention level estimating unit 64 estimates an attention level of the user for each object in the visible region. In the attention level estimating unit 64, the user behavior information from the user behavior information acquiring unit 61, and the information on the visible region and the object included in the visible region from the visible region extracting unit 63 are input. Additionally, the attention level estimating unit 64 checks the preference information database 62 and acquires the preference information of the user regarding the object in the visible region. The attention level estimating unit 64 estimates the attention level of the user for each object in the visible region based on the user behavior information and the preference information (hereinafter referred to as user information). Specifically, among the objects in the visible region, the closer the object is to the center of the visible region, the higher attention level of the user is estimated (additional point), and the higher the preference level of the user is, the higher attention level of the user is estimated (additional point). When the preference information for the object in the visible region is not registered in the preference information database 62, no additional point is added to the attention level. Further, when the time that the user's line-of-sight is facing the central object, which is closest to the center of the visible region, exceeds a predetermined time (fifth threshold), the voice of the user is detected while the user's line-of-sight is facing the central object, and when the voice feature amount of the corresponding voice exceeds a predetermined value (sixth threshold), the higher attention level of the user for the central object is estimated (additional point). As such, rather than simply estimating the attention level of the central object to the highest level, the attention level of the user for the object is estimated by considering the preference information, the time of the line-of-sight facing the central object, voice characteristics, etc. are also considered when estimating the attention level, thereby further improving the estimation accuracy of the attention level.

Further, when the driving load of the user is high, the attention level of the user for the object is estimated to be low. Specifically, in the present embodiment, when the driving load of the user is higher than a predetermined value (seventh threshold), the attention level of the user for all objects in the visible region is estimated to be 0. That is, when the driving load of the user is high, the user is estimated to be in a situation where one wants to concentrate on driving, so the estimation of the attention level is not actually performed, and the estimation of the attention level is performed after waiting until the driving load becomes less than a predetermined value. Therefore, in a case where the user wants to concentrate on driving for example, incorrect estimation of the attention level for the object in the visible region to be high is prevented. As such, in the estimation of the attention level, the driving load of the user is also taken into consideration, and when the driving load is high, the attention level of the user for the object is estimated to be low, so the estimation accuracy of the attention level is further improved.

The information of the attention level (attention level information) for each object estimated by the attention level estimating unit 64 is transmitted to the attention object specifying unit 65 and the confidence level estimating unit 66.

The attention object specifying unit 65 specifies which object in the visible region becomes an attention object. Here, the attention object refers to an object that is a topic provided to the user. In the attention object specifying unit 65, the attention level information from the attention level estimating unit 64 is input. The attention object specifying unit 65 specifies the object with the highest attention level among the objects in the visible region based on the attention level information, and when the attention level of the user for the corresponding object is higher than a predetermined threshold (third threshold), the corresponding object is specified as the attention object. By setting the threshold value (third threshold) to be specified as the attention object, for example, specification of an object that has simply entered the line-of-sight which the user is not paying attention to as the attention object is prevented. In the attention object specifying unit 65, the central object which is closest to the center of the visible region, is usually specified as the attention object. In particular, in the present embodiment, when a specific keyword is issued while the user's line-of-sight is facing the central object, the central object is set as the attention object (the attention level estimating unit 64 is set so that the attention level of the central object is the highest when a specific keyword is issued). For example, when the user utters a specific interrogative word (a keyword) such as "What is that?" while looking at a building which is the central object, the voice feature amount increases, and the central object (the corresponding building) is identified as the attention object. Further, in some cases, an object other than the central object may become the attention object. For example, when there is a cat and a park as symmetric objects in the visible region, the park has a wider range than the cat, so it is easy to be in the center in the visible region, but when the user is registered to like cats in the preference information database 62, the attention level for the cat is estimated to be high and the cat may be identified as the attention object. The information (attention object information) of the attention object specified in the attention object specifying unit 65 is transmitted to the confidence level estimating unit 66 and the information determining unit 48.

The confidence level estimating unit 66 estimates a confidence level which is a magnitude of specification accuracy for the attention object. In the confidence level estimating unit 66, the user behavior information from the user behavior information acquiring unit 61, information on the visible region and the object included in the visible region from the visible region extracting unit 63, the attention level information from the attention level estimating unit 64, and the attention object information from the attention object specifying unit 65 are input. Further, the confidence level estimating unit 66 checks the preference information database 62 and obtains the preference information of the user regarding the object in the visible region. The confidence level is estimated based on the information of the object included in the visible region and the user information (user behavior information and preference information). Specifically, the confidence level is estimated to be lower when the number of objects in the visible region is higher, lower when the objects in the visible region include more objects of high preference level of the user, and higher when the voice feature amount in the user's utterance is larger. The larger the number of objects in the visible region, the harder it is to determine which objects the user is actually paying attention to, and the less accurate the specification of the attention object becomes. Alternatively, when the number of objects in the visible region is small, the user is more likely to be actually paying attention to the specified attention object, and the confidence level is estimated to be high. Additionally, even when many objects with high user preference level are included in the visible region, it becomes difficult to determine which object the user is actually paying attention to, so the specification accuracy of the attention object is lowered. Alternatively, when there are few objects with high user preference level among the objects included in the visible region, the specification accuracy of the attention object increases, so the confidence level is estimated to be high. For example, in a case where there is only one object in the visible region of high user preference level, the corresponding object is specified as the attention object, but there is a high possibility that the user is actually paying attention to the corresponding object. Additionally, when the voice feature amount when the user utters is large, there is a high possibility that the user is actually paying attention to the specified attention object, and the confidence level is estimated to be high. For example, as an example in the explanation of attention object specifying unit 65, when there is a building at the end of the line-of-sight of the user and the user utters a specific interrogative word (a keyword) such as "What is that?", the voice feature amount increases. In this case, there is a high possibility that the user is actually paying attention to the corresponding building (attention object, central object), so the confidence level is also estimated to be high.

As described above, in the confidence level estimating unit 66, the confidence level is quantitatively estimated which is a level of specification accuracy of the attention object. The information of the confidence level (the confidence level information) estimated from the confidence level estimating unit 66 is transmitted to the information determining unit 48, the information output unit 50, and the output feature generating unit 67.

When the attention object information and the confidence level information are input to the information determining unit 48, the information determining unit 48 determines the topic and information provided to the user, as in the first embodiment. In this embodiment, for simplicity, confusing equipment, facility presence signal, and confusion factor are assumed to be absent. The information determining unit 48 determines the attention object as the topic, and the first information determines the information (an outline) on the attention object. The information on the attention object (including not only summary (first information) but also detailed information (second information)) is obtained from the information accumulation database 46 when they are registered in the information accumulation database 46, and they are obtained from an external database (not shown) when not registered. Additionally, in a case where the confusing equipment, the facility presence signal, the confusion factor, etc. are present, the information determining unit 48 selects one of the confusing equipment, a facility, an equipment equipped with the function of the confusion factor, and the attention object as the topic. In this case, priority is not particularly limited, but for example, the priority is set high in an order of confusing equipment, facility information, confusion factor, and attention object. The topic and the first information provided to the user which are determined in the information determining unit 48 are transferred to an information output unit 50.

In the output feature generating unit 67, the confidence level information is input from the confidence level estimating unit 66. The output feature generating unit 67 is configured to be able to transmit and receive information from the information output unit 50 and characterizes the output form of the first information determined by the information determining unit 48 according to the magnitude of the confidence level. Specifically, when the first information is uttered using a character (including a case where the output equipment 30 itself becomes the character), the character's appearance, action, voice, etc. are given characteristics according to the magnitude of the confidence level. Here, the appearance characteristics include the character's facial expression, size, color, shape, etc., and the action characteristics include rotation, vibration, moving speed, moving tempo, direction of the character's line-of-sight, etc. Further, the voice characteristics include intonation, volume, ending expression, etc. When the confidence level is low, these characteristics are used to indicate lack of confidence. For example, when the confidence level is low, the voice data and image data may be characterized by making the character's facial expression less confident, making the character smaller, or making the character's voice softer. As one specific example, assume that the character utters the first information on a cat for example, and when the confidence level is low, the voice data and the image data are characterized so that the character raises an eyebrow and says, "Now that I think about it, a video of the cat that ○○ (the user's name) likes has been uploaded . . . oh? I thought I was looking at the cat at the moment but maybe I was wrong?" in a soft voice. Further, when providing the first information by displaying a text in the display unit 32, the text is given characteristics according to the magnitude of the confidence level. Here, the characteristics of the text include text thickness, size, font, color, and expression at an end of a sentence. For example, when the confidence level is low, the image (text) data is characterized to express lack of confidence by making the text thinner, smaller, or adding a question word at the end of the sentence.

The information output unit 50 outputs the voice data and the image data of the first information, characterized by the output feature generating unit 67, through the output equipment 30. As a result, the information is provided to the user.

As described above, in the information providing method of the second embodiment, the first information is output in an output form according to the magnitude of the confidence level. As a result, even when the information that the user is not interested in is provided, worsening of the user's mood may be alleviated.

Further, the confidence level is estimated quantitatively, it is easier to determine which form of information should be provided to the user. That is, since the confidence level is quantified, it is easy to determine, for example, magnitude of assertive language used, and volume or size of a voice or a text.

Further, in a case where the first information is output, when it is estimated that the interest level of the user is low based on a reaction of the user (for example, when the interest level of the user is lower than the second threshold in the first embodiment, etc.), a correction value acquisition unit may be provided which acquires necessary correction values for estimation of the attention level and the confidence level. As a result, the estimation of the attention level and the confidence level becomes more suitable for the user.

FIG. 4 is a flow chart describing the information providing method according to the second embodiment. Following controls are all repeatedly executed at a predetermined time by the controller 40. Further, the following controls may be started upon startup of the information providing system 200, and may also be started with some information already output for the user. Here, the controller 40 always acquires the user state information from the user state information acquiring equipment 10, the position information, the surrounding information, and the steering angle or the accelerator opening degree information from the vehicle information acquiring equipment 20 at a predetermined time. Further, as described above, for simplicity, the confusing equipment, the facility presence signal, and the confusion factor are assumed to be absent in the present embodiment.

In step S201, the controller 40 estimates the driving load of the user (the driver) and determines whether the driving load is less than a predetermined value (seventh threshold). When the driving load is equal to or higher than the seventh threshold, the controller 40 temporarily suspends processing related to providing information until the driving load falls below the seventh threshold. On the other hand, when the driving load is smaller than the seventh threshold, the controller 40 executes processing of step S202.

In step S202, the controller 40 acquires the line-of-sight direction and viewing time in the line-of-sight direction (line-of-sight information) of the user, and determines whether the time during which the line-of-sight of the user is facing an end of the line-of-sight direction of the user (hereinafter also referred to as gaze time) is longer than a predetermined time (fourth threshold). When the gaze time is shorter than the fourth threshold, the controller 40 returns to the processing of step S201 and does not execute the processing before step S203 until the driving load becomes smaller than the seventh threshold and the gaze time becomes equal to or greater than the fourth threshold. On the other hand, when the gaze time is equal to or longer than the fourth threshold, the controller 40 executes the processing of step S203.

In step S203, the controller 40 specifies the visible region based on the line-of-sight information, and at the same time, specifies the object included in the visible region based on the line-of-sight information, the current position information on the map, and the surrounding information.

In step S204, the controller 40 determines whether the user has uttered a specific keyword. The specific keyword may be set as, for example, "What's that?" or "Huh?", in addition to the example above ("What is that?"). When the user is detected to have uttered a specific keyword, the controller 40 executes processing of step S214. On the other hand, when it is not detected that the user has uttered a specific keyword, the controller 40 executes processing of step S205.

In step 214, the controller 40 specifies the central object as the attention object, and executes processing of step S208.

When it is not detected that the user has uttered a specific keyword, the controller 40 estimates the attention level of the user for each object included in the visible region in step S205. As described above, the closer the object is to the center of the visible region and the higher the preference level of the user, the higher the attention level is estimated. Further, when a time during which the user's line-of-sight is facing the central object which is closest to the center of the visible region exceeds a predetermined time (fifth threshold), the voice of the user is detected while the user's line-of-sight is facing the central object, and when voice feature amount of the corresponding voice exceeds a predetermined value (sixth threshold), the attention level for the central object is estimated to be high.

In step S206, the controller 40 determines whether the attention level (maximum attention level) of the object with the highest attention level is higher than a predetermined threshold (third threshold). The third threshold may be set to a value such that the attention level exceeds the third threshold, for example, when there is a possibility that the user may want to receive even a little information on the corresponding object. When the attention level of the object with the highest attention level is higher than the third threshold, the controller 40 executes processing of step S207. On the other hand, when the attention level of all objects is less than or equal to the third threshold, the controller 40 returns to the processing of step S201.

In step S207, the controller 40 specifies the object with the highest attention level as the attention object.

When the attention object is specified, the controller 40 estimates the confidence level in step S208. As described above, the confidence level is estimated based on the information on the objects included in the visible region and the user information, and the higher the number of objects included in the visible region, the lower the confidence level, and the more objects of high preference level of the user are included in the visible region, the lower the confidence level, and the larger the voice feature amount when the user utters, the higher the confidence level.

When the confidence level is estimated, the controller 40 outputs the information (first information) in an output form according to the magnitude of the confidence level in step S209. For example, when the confidence level is low, the voice data and the image data are characterized and output to express lack of confidence. On the other hand, when the confidence level is high, the voice data and the image data are output with characteristics such as making the text bigger or the voice louder, or giving the character a confident facial expression.

When first information is output, the controller 40 executes the processings shown in steps S104 to S106 and S115, S116, and S125. Since the processing of the steps are the same as in the first embodiment, description is omitted.

According to the information providing method of the above-described second embodiment, the following effects may be obtained.

The information providing method of the present embodiment specifies the attention object which has the highest attention level of the user among the objects in the visible region where the user can view, and estimates the confidence level which is a magnitude of specification accuracy for the attention object based on the information of the object in the visible region and the user information (preference information on the user's preference level and user behavior information on the user's behavior). Then, the attention object is determined as a topic, the information of the attention object is determined as the first information to be provided to the user, and the corresponding first information is output in a form of an output according to the magnitude of the confidence level. As such, by outputting the first information in the form of the output based on the magnitude of the confidence level, worsening of the user's mood may be alleviated even when information not of the user's interest has been provided.

The information providing method of the present embodiment estimates the attention level of the user for each object in the visible region based on the preference information, the line-of-sight direction of the user, the voice feature amount when the user utters, and the user behavior information including the driving load of the vehicle that the user is driving. Then, the attention level of the user is determined as the first information for providing information on the attention object which has the highest attention level of the user. As such, in order to estimate the attention level of the user for each object in the visible region from the preference information and the user behavior information, it is possible to determine which object information should be provided to the user even when a plurality of objects are included in the visible region.

Further, since the attention level of the user is estimated based not only on the line-of-sight direction of the user and utterance (voice characteristics), but also on the user's driving load, incorrect estimation of the attention level to be high is prevented a situation where the user wants to focus on driving. Therefore, the estimation accuracy of the attention level is further improved.

The information providing method of the present embodiment estimates the attention level of the user to be higher for an object closer to the center of the visible region and estimates the attention level to be higher for an object with higher preference level of the user. Further, for the attention level of the user for the central object which is an object closest to the center of the visible region, when a time during which the user's line-of-sight is facing the central object exceeds a predetermined time (fifth threshold), the user's voice is detected while the user's line-of-sight is facing the central object, and the attention level is estimated to be relatively higher when the voice feature amount of the corresponding voice exceeds a predetermined value (sixth threshold). As such, rather than simply estimating the attention level of the central object to be the highest level, the attention level of the user for the object is estimated by considering the preference information, the dime during with the user's line-of-sight is facing the central object, the voice characteristics, etc. As a result, the estimation accuracy of the attention level is further improved.

The information providing method of the present embodiment estimates the attention level of the user for an object to be low when the driving load is equal to or higher than a predetermined value when the user is driving a vehicle. This prevents mistakenly estimating the attention level of an object and providing the information on the corresponding object to the user when the user wants to focus on driving.

The information providing method of the present embodiment specifies an object as the attention object when the attention level of the user for the object is the highest, and when the attention level is higher than a predetermined third threshold. By setting a threshold value (third threshold) to specify as the attention object in this way, for example, a case of specifying an object that is simply in view and not in the user's attention as the attention object is prevented. That is, causing inconvenience to the user by providing information that the user does not particularly want is prevented.

The information providing method of the present embodiment estimates the confidence level to be lower as the number of objects in the visible region increases, estimates the confidence level to be lower as the number of objects of high user preference level included in a gaze region, and estimates the confidence level to be higher when the voice feature amount of the user's utterance is higher. Since the confidence level is quantitatively estimated in this way, it is easier to determine which form of information should be provided to the user.

Further, in the present embodiment, the confidence level is estimated based on the information of the object and the user information, and the first information is output in the output form according to the magnitude of the confidence level. However, it is also possible, for example, to provide a timing decision unit to estimate whether the timing of providing the information is appropriate, and to output the information in an output form according to a magnitude of appropriateness of the timing of providing the information. In this case, the appropriateness of the timing may be determined based on driving situation of the user (driving load, etc.) or data on the reaction of the user when the information was provided in the past.

Further, the information may be output in an output format according to novelty of the information (freshness of the information) to be provided to the user or a level of reliability of an information source. That is, the output format may be determined after comprehensively determining the information in addition to the confidence level of the present embodiment.

Further, in any embodiment, the information determining unit 48 acquires the information provided to the user from the information accumulation database 46, but it is not limited thereto, and the information provided to the user may be acquired from an external database.

Further, each processing sequence shown in FIGS. 2 and 4 shows an example for realizing the present embodiment, and a part of the order of each processing sequence may be exchanged within a range that can realize the present embodiment, and each processing sequence may be omitted or other processing sequences may be added.

Embodiments of the present disclosure were described above, but the above embodiments are merely examples of applications of the present disclosure, and the technical scope of the present disclosure is not limited to the specific constitutions of the above embodiments.

Each of the above-described embodiments has been described as a single embodiment, but they may be combined as appropriate.

Further, this application claims priority based on Japanese Patent Application 2022-078464, filed with the Japan Patent Office on May 11, 2022, and the entire contents of this application are incorporated herein by reference.

What is claimed is:

1. An information providing method for providing information using an output equipment disposed in a vehicle to a user who is an occupant of the vehicle, the information providing method comprising:

determining a topic provided to the user and first information related to the corresponding topic, outputting the first information through the output equipment, detecting the user's reaction when the output equipment has output the first information, estimating an interest level of the user on the topic based on the user's reaction, and outputting a second information which is more detailed information on the topic than the first information through the output equipment when the interest level is higher than a predetermined first threshold, wherein a line-of-sight direction of the user is detected, wherein a visible region visible to the user and an object in the visible region is specified based on the detected line-of-sight direction of the user, wherein an attention level of the user for each of the object in the visible region is estimated based on preference information on the user's preference level accumulated in a database and user information including user behavior information on a detected user's behavior while detecting the user's behavior, wherein an attention object is specified which is an object with the highest attention level of the user, wherein a confidence level, which is a magnitude of specification accuracy for the attention object, is estimated based on information on the object in the visible region and the user information, and wherein the attention object is determined as a topic and the corresponding first information is output in a form of an output according to magnitude of the confidence level while determining information on the attention object as the first information.

2. The information providing method of claim 1, wherein the user's reaction includes an action of the user, and wherein an interest level of the user for the first information is estimated based on the action of the user when the output equipment has output the first information.

3. The information providing method of claim 1, wherein the output equipment includes a display unit for outputting an image and a voice output equipment for outputting a voice, wherein the first information is at least information capable of outputting as voice, wherein the first information is divided into a first part and a second part, wherein at least one of a first character and a second character is displayed on the display unit, wherein the first part is output through the voice output equipment as an utterance by the first character, and wherein the second part is output through the voice output equipment as an utterance by the second character.

4. The information providing method of claim 3, wherein, when the output equipment outputs the first information, the interest level is estimated to be high when it is detected that the user performed an action to visually recognize at least one of the first character and the second character.

5. The information providing method of claim 4, wherein the second information is at least information capable of being output as voice, and wherein the second information is output to the voice output equipment as an utterance by the first character or the second character.

6. The information providing method of claim 1, wherein the output equipment includes a display unit for outputting an image, wherein the second information is information capable of outputting at least by the image, and wherein the second information is output to the display unit as the image.

7. The information providing method of claim 1, wherein the first information is information on handling of an equipment in the vehicle capable of being used by the user.

8. The information providing method of claim 7, wherein, when it is detected that a new equipment has been added to the vehicle, a predetermined equipment in the vehicle has been updated, or a predetermined equipment in the vehicle has not been used for a long time, the corresponding equipment detected to be added, updated, or not used for a long time is determined as a topic, and information on handling of the corresponding equipment is output as the first information.

9. The information providing method of claim 7, wherein the user's behavior is detected before determining the first information, and wherein, when the user is estimated to be confused about handling of a predetermined equipment from the detected user's behavior, the corresponding predetermined equipment is determined as a topic, and information on handling of the corresponding predetermined equipment is determined as the first information to output.

10. The information providing method of claim 1, wherein position information on a current position of the vehicle is acquired, wherein facility information on a facility around the current position of the vehicle is acquired based on the position information and map information, and wherein the facility is determined as a topic, and the facility information is determined as the first information to output.

11. The information providing method of claim 1, wherein the user behavior information is the line-of-sight direction of the user, a voice feature amount when the user utters, and a driving load of the vehicle driven by the user.

12. The information providing method of claim 11, wherein the attention level of the user for the object is detected to be higher as the object is closer to a center of the visible region and is estimated to be higher as the preference level of the user is higher, and wherein the attention level of the user for a central object which is an object closest to the center of the visible region is estimated to be relatively higher when a time for which the line-of-sight of the user is facing the central object exceeds a predetermined time, and the user's voice is detected while the line-of-sight of the user is facing the central object and when a voice feature amount of the corresponding voice exceeds a predetermined value.

13. The information providing method of claim 11, wherein, when the driving load while the user is driving the vehicle is equal to or greater than a predetermined value, and wherein the attention level of the user for the object is estimated to be low.

14. The information providing method of claim 11, wherein, when the attention level of the user for the object is the highest and the attention level is higher than a predetermined third threshold, the corresponding object is specified as the attention object.

15. The information providing method of claim 11, wherein the confidence level is estimated to be lower as a number of objects in the visible region is larger, to be lower as objects in the gaze region include more objects having the high preference level of the user, and to be higher as the voice feature amount when the user utters is larger.

16. The information providing method of claim 1, wherein the first information is changed when the estimated interest level of the user on the first information is lower than a predetermined second threshold which is lower than the first threshold.

17. The information providing method of claim 1, wherein the first information is changed when a state where the estimated interest level of the user on the first information is lower than the predetermined second threshold which is lower than the first threshold continues for a predetermined time.

18. The information providing method of claim 1, wherein the output equipment includes a display unit for outputting an image and a voice output equipment for outputting a voice, wherein the first information is at least information capable of outputting as voice, wherein the first information is divided into a first part and a second part, wherein at least one character is displayed on the display unit, wherein the first part and the second part are output to the voice output equipment as an utterance by the character, and wherein when the output equipment outputs the first information, the interest level is estimated to be high when it is detected that the user performed an action to visually recognize the character.

19. An information providing system for providing information for a user who is an occupant of a vehicle, comprising:

an output equipment for outputting the information;

an information determining unit for determining information to be provided to the user;

an information output unit for outputting the information to be provided to the user determined by the information determining unit through the output equipment;

a user state information acquiring equipment for detecting the user's reaction to the output information; and an interest level estimating unit for estimating the interest level of the user for the output information based on the user's reaction acquired by the user state information acquiring equipment, wherein the information output unit outputs second information which is more detailed information on the first information through the output equipment when the interest level of the user for the output first information is estimated to be higher than a predetermined first threshold, and wherein the user state information acquiring equipment detects a line-of-sight direction of the user, the information providing system further comprising:

a visible region extracting unit specifies a visible region visible to the user and an object in the visible region based on the detected line-of-sight direction of the user, a user behavior information acquiring unit detects user behavior information on a user's behavior, an attention level estimating unit estimates an attention level of the user for each of the object in the visible region based on preference information on the user's preference level accumulated in a database and user information including user behavior information on the detected user's behavior while detecting the user's behavior, an attention object specifying unit specifies an attention object which is an object with the highest attention level of the user, a confidence level estimating unit estimates a confidence level, which is a magnitude of specification accuracy for the attention object, based on information on the object in the visible region and the user information, wherein the information determining unit determines the attention object as a topic and the information on the attention object as the first information, and wherein the information output unit outputs the corresponding first information in a form of an output according to magnitude of the confidence level.

* * * * *